April 9, 1963 A. KRONSTEIN 3,084,732
TIRE
Filed April 27, 1961 2 Sheets-Sheet 1

April 9, 1963  A. KRONSTEIN  3,084,732
TIRE
Filed April 27, 1961  2 Sheets-Sheet 2

United States Patent Office 3,084,732
Patented Apr. 9, 1963

3,084,732
TIRE
Alexandre Kronstein, 1 Rotisserie, Geneva, Switzerland
Filed Apr. 27, 1961, Ser. No. 105,941
Claims priority, application Switzerland Apr. 29, 1960
2 Claims. (Cl. 152—212)

My invention has for its object a tire and tread of which is provided with an anti-skid reinforcement including a plurality of elongated metal elements sloping over at least a section of their length and adapted to engage the road surface.

Figure 2:
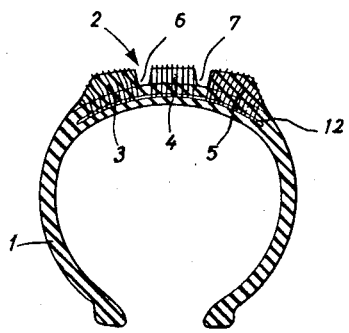
Figure 1:
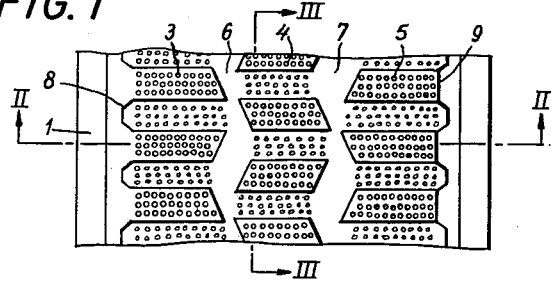
Figure 3:
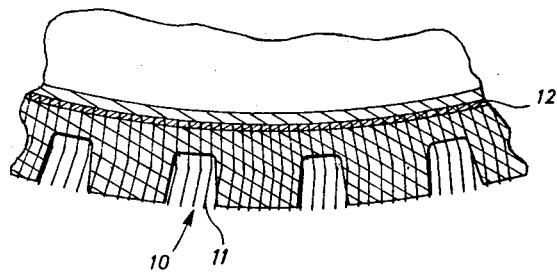
Figure 4:
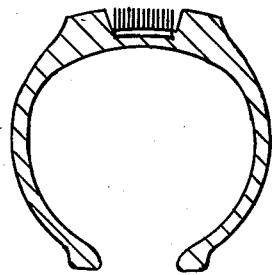
Figure 6:
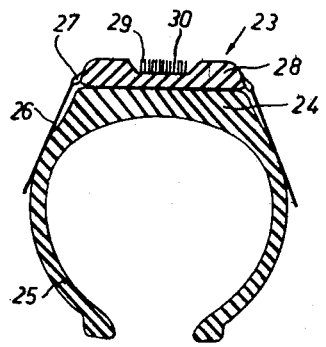
Figure 5:
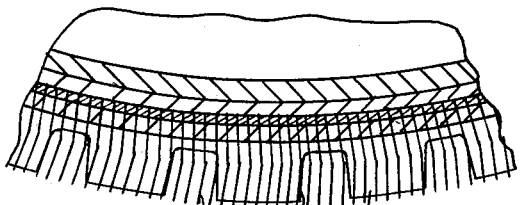

I have illustrated by way of example in the accompanying drawings three preferred embodiments of my invention. In said drawings:

FIG. 1 is a partial elevational view of a tire in which a first embodiment of the invention is incorporated, FIGS. 2 and 3 are cross-sections through lines II—II and III—III respectively of FIG. 1, FIGS. 4 and 5 are respectively similar to FIGS. 2 and 3 and show a second embodiment of the invention, FIG. 6 is similar to FIGS. 2 and 5 and shows a third embodiment of the invention.

Figure 7:
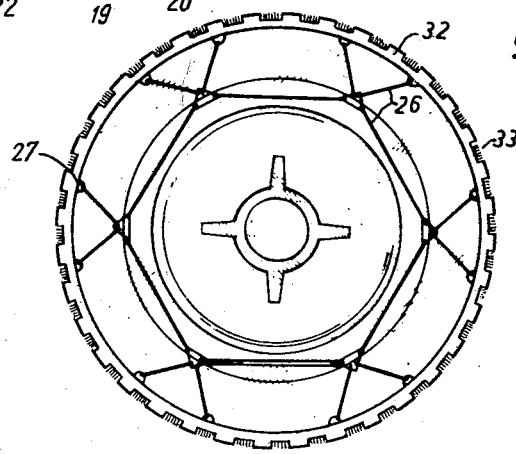

FIG. 7 is a side view of said third embodiment.

In the first embodiment illustrated (FIGS. 1 to 3), the tire includes a cover 1, of which the outer surface forms a tread 2 subdivided into three annular areas 3, 4 and 5 by two longitudinal furrows 6 and 7. Transverse grooves 8 cut the three areas into small projecting blades 9. The tread is provided with a metal reinforcement 10 adapted to increase the adherence between the tread and ground surface and thereby the efficiency of the braking and the resistance against skidding. Said reinforcement is constituted by a plurality of elongated elements, the lower ends of which are secured to a web 12 formed inside the tire material and the upper ends of which extend slightly beyond the surface of said tire material.

Some of these elements are thus almost entirely embedded inside the mass of the tire material, whereas other elements extend in the grooves or between the projecting blades and are free over a substantial fraction of their length. Each element is furthermore slightly bent at mid-height, so that it may yield elastically under the action of axial stresses.

In the central area 4, all the metal elements are raised in parallelism with the plane in which the tire revolves, but a number of said elements slope slightly in the direction of rotation of said tire, while the other elements slope in the opposite direction. These elements yield elastically whenever the tire runs over ground, in particular in the case of those which are free, so as to rise and engage the ground, the elements sloping forwardly yielding during acceleration of the vehicle and the elements sloping rearwardly during braking. Said elements may be embedded throughout the mass of the tire as close as possible to one another, so that their number may be as large as possible throughout the tread surface.

A part at least of the elements arranged in the areas 3 and 5 slope towards the edge of the tire, so as to oppose any lateral skidding.

In the second embodiment illustrated in FIGS. 4 and 5, the tire includes a cover 13, of which the upper surface forms a tread 14 separated into two areas 15 and 16 by a longitudinal furrow 17 engaged by a comparatively broad annulus 18. Transverse grooves 19 cut these annular areas into castellations 20. The annulus is constituted by a web 21 inside which are secured the inner ends of elongated elements 22, the outer ends of which extend slightly beyond the outer surface of the cover forming the tread. Said elements which are free over a substantial fraction of their length, are slightly bent at mid-height, so as to allow them to yield elastically under the action of axial stresses. The annulus is permanently fitted over the tire, for instance through vulcanization.

In the third embodiment illustrated in FIGS. 6 and 7, an auxiliary tread 23 is fitted removably over the tread 24 of the tire 25 through a system of cables stretched over the sides of the tire and extending through annuli 27 secured to said auxiliary tread 23.

Said auxiliary tread 23 is constituted by a rubber annulus 28 provided in its medial section with an annular recess 29 carrying an anti-skid reinforcement 30. Grooves 31 extending transversely over the surface of the annulus 28 cut it into the shape of castellations 32.

The different embodiments and modifications of the tire according to my invention produce an extremely efficient anti-skidding effect, particularly on moist road surfaces or roads covered with ice or glazed frost.

Obviously, my invention is not limited to the arrangements illustrated and described and many other modifications may be provided within the scope of the invention as defined by the accompanying claims.

What I claim is:

1. In a tire for an automobile wheel, said tire having a tread surface with longitudinal and transverse grooves, the provision of independent wire sections rigidly mounted radially in the body of the tire and projecting outwardly to the periphery of the tread, said wire sections being omitted only from the longitudinal grooves and being bent slightly at points registering with a geometrical surface coaxial with the tread surface and passing through the transverse grooves, the outer ends of the wire sections extending to the periphery of said tread to engage a road surface with their respective outer ends.

2. An improved anti-skid tire for mounting on a wheel in the plane of wheel rotation, said tire having a body with an outer tread surface scored with longitudinal and transverse grooves to form a periphery of projecting blades and comprising: a web set in said body coaxial to said tread surface; a plurality of metal reinforcing wires, each said wire having substantially oppositely disposed ends, said wires being respectively secured by one of their said oppositely disposed ends to said web and projecting outwardly through said blades and said transverse grooves only for the other of said oppositely disposed ends to extend slightly beyond said periphery of the projecting blades, said wires being bent intermediate said oppositely disposed ends in said plane of wheel rotation, said bends being in the blades and transverse grooves, whereby said other of said oppositely disposed ends of said wires form a non-skid gripping tread surface.

References Cited in the file of this patent

UNITED STATES PATENTS

| 634,501 | Manney | Oct. 10, 1899 |
| 990,350 | De Ferranti | Apr. 25, 1911 |
| 1,135,183 | Hewitt | Apr. 13, 1915 |
| 1,163,338 | Harris | Dec. 7, 1915 |
| 1,217,619 | Molin | Feb. 27, 1917 |
| 1,864,939 | Respess | June 28, 1932 |
| 1,878,679 | De Bruijn | Sept. 20, 1932 |

FOREIGN PATENTS

| 26,379 | Great Britain | 1912 |